United States Patent
Smith et al.

(10) Patent No.: US 7,381,231 B2
(45) Date of Patent: Jun. 3, 2008

(54) FINISHING COMPOSITIONS WITH REDUCED VOLATILE ORGANIC COMPOUNDS

(75) Inventors: Richard S. Smith, West St. Paul, MN (US); Lowell W. Holland, St. Paul Park, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 394 days.

(21) Appl. No.: 10/767,633

(22) Filed: Jan. 29, 2004

(65) Prior Publication Data

US 2005/0166464 A1    Aug. 4, 2005

(51) Int. Cl.
*C09G 1/00* (2006.01)
*C09G 1/02* (2006.01)

(52) U.S. Cl. ............... 51/307; 51/309; 106/3; 106/11; 106/287.1; 106/287.13; 106/287.14

(58) Field of Classification Search ........... 51/307, 51/309; 106/3, 11, 287.1, 287.13, 287.14
See application file for complete search history.

(56) References Cited

U.S. PATENT DOCUMENTS

| | | | |
|---|---|---|---|
| 3,847,622 A * | 11/1974 | Brandl et al. ............ 106/10 |
| 4,218,250 A | 8/1980 | Kasprzak |
| 4,537,914 A | 8/1985 | Smith et al. |
| 4,665,116 A | 5/1987 | Kornhaber et al. |
| 5,080,828 A * | 1/1992 | Terae ..................... 516/120 |
| 5,261,951 A * | 11/1993 | Sejpka et al. ............ 106/3 |
| 5,264,027 A * | 11/1993 | Martin et al. ............ 106/3 |
| 5,316,692 A * | 5/1994 | John ..................... 510/397 |
| 5,326,387 A | 7/1994 | Faber et al. |
| 5,531,814 A | 7/1996 | Bahr et al. |
| 5,645,633 A * | 7/1997 | Ogawa ................ 106/287.14 |
| 5,882,387 A | 3/1999 | Martin et al. |
| 5,962,074 A | 10/1999 | Wollner |
| 6,734,153 B2 * | 5/2004 | Scheper ................. 510/285 |
| 2003/0047816 A1 * | 3/2003 | Dutta ..................... 257/788 |
| 2004/0144406 A1 * | 7/2004 | Garabedian et al. ..... 134/26 |

FOREIGN PATENT DOCUMENTS

| | | |
|---|---|---|
| DE | 201 19 694 | 5/2003 |
| GB | GB 1330733 | 9/1973 |

OTHER PUBLICATIONS

R.J. Lewis, Sr.; "Hawley's Consensed Chemical Dictionary"; Twelfth edition; 1992; pp. 918-919.*
Dow Corning Corporation, Product Information, "Information About Dow Corning® 244, 245, 246, 344, and 345 Fluids", Form No. 25-925-97, 4 pages, 1997.

* cited by examiner

*Primary Examiner*—Michael A Marcheschi
(74) *Attorney, Agent, or Firm*—Douglas B. Little

(57) ABSTRACT

Finishing composition substantially free of non-volatile silicone materials and comprises a mixture of abrasive particles and an emulsion, which comprises water, a volatile siloxane, and a lubricant.

17 Claims, No Drawings

FINISHING COMPOSITIONS WITH REDUCED VOLATILE ORGANIC COMPOUNDS

FIELD OF THE INVENTION

The present invention relates to finishing compositions. More particularly, the present invention relates to finishing compositions that have low concentrations of volatile organic compounds and exhibit good handling properties.

BACKGROUND

Finishing compositions may be used as paint refinishing materials to remove scratches left by sanding operations, which remove paint defects on vehicle surfaces. Typically when removing a paint defect, the defect is sprayed with a clearcoat and then removed using an abrasive material (e.g., sandpaper). However, this leaves visible scratch marks on the vehicle surface. The scratch marks may be removed by applying and distributing a finishing composition with abrasive buffing pads. A surface-protective sealant (seal coat) may then optionally be applied.

Conventional finishing compositions contain solvents to improve the handling properties of the compositions (e.g., working time, product deposition on the surface, pick-up with a buffing pad, and clean up). These solvents evaporate after the finishing is applied to the surface. However, environmental regulations require relatively low concentrations (e.g., less than 17 percent, by weight) of volatile organic compounds (VOC) in certain products.

SUMMARY

The present invention relates to a finishing composition that exhibits good handling properties and leaves substantially no oily residue after application. The inventive compositions can be formulated as compounds, polishes, or glazes for finishing surfaces such as painted surfaces, marine gel coats, metals, and ceramics. This finishing composition is substantially free of non-volatile silicone materials and includes a mixture of abrasive particles and an emulsion, in which the emulsion includes water, a volatile siloxane, and a lubricant. The term "non-volatile silicone material" is defined herein as a silicone having a boiling point of at least 250° C. selected from: a non-cyclic, silicone-containing material that exhibits a kinematic viscosity greater than 5 centistokes (cSt) ($5.0 \times 10^{-6}$ m$^2$/s) at 25° C.; a non-cyclic, silicone-containing material that exhibits a kinematic viscosity of 5 cSt ($5.0 \times 10^{-6}$ m$^2$/s) at 25° C. provided that the concentration of such non-cyclic silicone-containing material in the finishing composition is at least seven percent by weight; and a cyclic silicone-containing material that exhibits a kinematic viscosity greater than 7 cSt ($7.0 \times 10^{-6}$ m$^2$/s) at 25° C.

The inventive finishing composition uses environmentally acceptable solvents while avoiding the use of high boiling solvents in quantities that can leave oily residue on the surface to be treated, such as a vehicle surface being repaired. The oily residue is difficult to remove from the vehicle surface and visually obscures scratch marks to be removed. With such high boiling solvents, extra time and effort are required to ensure proper repair of the paint defects. Being free of non-volatile silicone materials and oily residue, the inventive finishing yields an improvement in the appearance of painted surfaces.

The invention further relates to a method of making a composition. The method includes combining a mixture of water, a volatile siloxane, a non-silicone-based lubricant, and an emulsifier to form an emulsion, the emulsifier being effective to make a stable emulsion. Abrasive particles are mixed into the emulsion to complete formation of the composition.

The invention further relates to a method of treating a surface. The method includes applying a finishing composition on the surface, the finishing composition comprising water, abrasive particles, a volatile siloxane, a non-silicone-based lubricant, and an emulsifier effective to create a stable emulsion. The volatile siloxane is allowed to substantially evaporate from the surface, and leave a remaining portion of the finishing composition on the surface, said remaining portion being substantially free of oily residue.

DETAILED DESCRIPTION

The present invention includes a finishing composition capable of functioning as a paint refinishing material, or rubbing compound, and includes a mixture of abrasive particles dispersed within an emulsion. The emulsion may be formed with an emulsifier, and includes water, a volatile siloxane, and a lubricant. The finishing composition exhibits good handling properties and leaves substantially no oily residue after application.

The finishing composition is also substantially free of non-volatile silicone materials (i.e., less than 0.2% by weight of the finishing composition of the present invention). Prior finishing compositions incorporate non-volatile silicone materials to aid with handling properties, gloss, and water repellency. However, unlike volatile silicone materials, such as volatile siloxanes, non-volatile silicone materials do not evaporate after application. Non-volatile silicone materials create residual films that may diffuse into the surrounding air (e.g., as droplets in an automobile body shop) and contaminate other surfaces (such as other vehicles being painted). Use of non-volatile silicone materials in finishing compositions requires extra clean-up measures for facilities such as automobile-body repair shops.

One or more volatile siloxanes are included in the finishing composition of the present invention to improve handling properties. A particularly important handling property affected by the volatile siloxane(s) is working time. Generally, finishing compositions should allow for a working time of about 4½ to about 5 minutes for a three-cycle process (i.e., applying and buffing the finishing composition three times to remove all scratch marks). The working time is generally governed by the rate of evaporation of volatile solvents in the finishing composition. If solvent evaporation is too fast, the working time may be too short to allow adequate removal of the scratch marks. Additional applications of the finishing material may then be required. If evaporation is too slow or non-existent, a residual film remains. The residual film or oily residue typically consists of non-evaporated high-boiling organic solvents. When volatile siloxanes evaporate from an applied film of the inventive finishing, the remaining portion of the finishing composition is at least substantially free of oily residue.

The volatile siloxanes used in the present invention may include linear, cyclic, and branched structures, and combinations thereof all with a boiling point less than 250° C. In general, cyclic siloxanes retain volatility at higher kinematic viscosities than non-cyclic siloxanes. Suitable kinematic viscosities for non-cyclic volatile siloxanes are less than 5 cSt ($5.0 \times 10^{-6}$ m$^2$/s) at 25° C., and may further include 5 cSt (5.0×10$^{-6}$ m$^2$/s) at 25° C. if the concentration of the noncyclic volatile siloxanes in the finishing composition is less than about 7% by weight. For cyclic volatile siloxanes, suitable kinematic viscosities are 7 cSt (7.0×10$^{-6}$ m$^2$/s) at 25° C., or less. Siloxanes with higher kinematic viscosities at 25° C. are typically not very volatile, and may cause an undesirable effect when refinishing existing materials (called "fisheye" by painters). The fisheye effect is a beading of paint on a surface, which detracts from the desired appearance.

Volatile linear siloxanes usable in the present invention may be represented by the average formula:

in which suitable integer values for "a" include 0-5. Accordingly, examples of suitable volatile linear siloxanes include hexamethyldisiloxane, having a formula (CH$_3$)$_3$SiOSi(CH$_3$)$_3$; octamethyltrisiloxane, having a formula (CH$_3$)$_3$SiO(CH$_3$)$_2$Si(CH$_3$)$_3$; decamethyltetrasiloxane, having a formula (CH$_3$)$_3$SiO{SiO(CH$_3$)$_2$}$_2$Si(CH$_3$)$_3$; dodecamethylpentasiloxane, having a formula (CH$_3$)$_3${SiO(CH$_3$)}$_3$Si(CH$_3$)$_3$; tetradecamethylhexasiloxane, having a formula (CH$_3$)$_3$SiO{SiO(CH$_3$)$_2$}$_4$Si(CH$_3$)$_3$; hexadecamethylheptasiloxane, having a formula (CH$_3$)$_3$SiO{SiO(CH$_3$)$_2$}$_5$Si(CH$_3$)$_3$; and combinations thereof.

Volatile cyclic siloxanes are particularly suitable materials for the volatile siloxane, and may be represented by the formula {SiO(CH$_3$)$_2$}$_b$ in which suitable integer values for "b" include 4-6. Examples of suitable volatile cyclic siloxanes include octamethylcyclotetrasiloxane, having a formula {(CH$_3$)$_2$SiO}$_4$, and commercially available from Dow Corning Corp., Midland, Mich., under the trade designations "Dow Corning 244 and 344 Fluids" (kinematic viscosities of 0.25 cSt (2.5×10$^{-7}$ m$^2$/s) at 25° C.); decamethylcyclopentasiloxane, having a formula {(CH$_3$)$_2$SiO}$_5$, and commercially available from Dow Corning Corp. under the trade designations "Dow Corning 245 and 345 Fluids" (kinematic viscosities of 4.2 cSt (4.2×10$^{-6}$ m$^2$/s) and 5 cSt (5.0×10$^{-6}$ m$^2$/s) at 25° C., respectively); dodecamethylcyclohexasiloxane, having a formula {(CH$_3$)$_2$SiO}$_6$, and commercially available from Dow Corning Corp. under the trade designation "Dow Corning 246 Fluid" (kinematic viscosity of 6.8 cSt (6.8×10$^{-6}$ m$^2$/s) at 25° C.); and combinations thereof.

Volatile branched siloxanes are derivations of volatile linear and cyclic siloxanes. Examples of volatile branched siloxanes usable in the present invention include heptamethyl-3-{(trimethylsilyl)oxy}trisiloxane, having a formula C$_{10}$H$_{30}$O$_3$Si$_4$; hexamethyl-3,3,bis{(trimethylsilyl)oxy}trisiloxane, having a formula C$_{12}$H$_{36}$O$_4$Si$_5$; pentamethyl{(trimethylsilyl)oxy}cyclotrisiloxane, having a formula C$_8$H$_{24}$O$_4$Si$_4$; heptamethyl{(trimethylsilyl)oxy}cyclotetrasiloxane, having a formula C$_{10}$H$_{30}$O$_5$Si$_5$; and combinations thereof.

The suitable volatile siloxanes described herein may be used alone or in any combination. Similar information regarding suitable volatile siloxanes is disclosed in Bahr et al., U.S. Pat. No. 5,531,814, which is incorporated herein by reference in its entirety.

The lubricants that may be used in the finishing composition include substantially silicone-free materials that aid the finishing composition in lubrication and handling properties. Examples of suitable lubricants include oils (e.g., mineral, pine, and paraffinic oils), oleic acid, glycerol, polypropylene glycols, polybutylene glycols, and combinations thereof.

The emulsifier of the finishing composition may be any emulsifier useful in preparing stable oil-in-water emulsions or stable water-in-oil emulsions. A stable emulsion is one in which the dispersed phase remains dispersed substantially within the continuous phase over a long time, which substantially prevents phase separation over time (sufficient for storage of the composition). Examples of suitable emulsifiers include nonionic emulsifiers, anionic emulsifiers, cationic emulsifiers, and combinations thereof. Nonionic emulsifiers are particularly suitable for use with the finishing composition, and include alcohol ethoxylates (e.g., "Neodol", commercially available from Shell Chemical, Houston, Tex.; "Tomadol", commercially available from Tomah Products, Inc., Milton, Wis.; and "Tergitol", commercially available from Dow Corning Corp.), alkyl phenol ethoxylates (e.g., "Triton", commercially available from Dow Corning Co.; and "Macol OP 10 SP" commercially available from BASF Corp., Mount Olive, N.J.), polyoxypropolene/polyoxyethylene block copolymers (e.g., "Pluronic", commercially available from BASF Corp.), sorbitan fatty esters (e.g., "Span", commercially available from ICI Americas, Wilmington, Del.), castor oil (e.g., "Emulsion A Oil", commercially available from CasChem, Bayonne, N.J.), polyoxyethylene fatty esters, polyoxyalkylene monostearates (e.g., "Tween", commercially available from Uniquema, New Castle, Del.), alkynols (e.g., "Surfynol", commercially available from Air Products and Chemicals, Inc., Allentown, Pa.), polyoxyethylene nonylphenols, polyoxyethylene fatty alcohols, and combinations thereof. Suitable anionic emulsifiers include alkyl-aryl sulphonates. Suitable cationic emulsifiers include polyoxyethylene fatty amines.

Examples of suitable abrasive particles include aluminum oxides, silica, aluminum silicates, silicon carbides, and combinations thereof. Suitable average particle sizes range from about 0.1 to about 100 micrometers. Particularly suitable average particle sizes range from about 2 to about 50 micrometers. The type of filler used in the finishing composition generally provides the color of the finishing composition. For example, when incorporating silica abrasive particles, the finishing composition exhibits a tan-brown color. Alternatively, when incorporating aluminum oxide abrasive particles, the finishing composition exhibits a white color.

All concentrations herein are expressed in weight percent, unless otherwise stated. Additionally, all amounts are expressed on a weight basis, unless otherwise stated. Suitable compositional ranges in the finishing composition include an effective amount of about 10.0% to about 60.0% water, about 3.0% to about 20.0% volatile siloxane, about 0.1% to about 10.0% lubricant, about 0.1% to about 10.0% emulsifier, and greater than 0% to about 60.0% abrasive particles. Particularly suitable compositional ranges include about 30.0% to about 50.0% water, about 5.0% to about 10.0% volatile siloxane, about 1.0% to about 5.0% lubricant, about 0.1% to about 5.0% emulsifier, and about 3.0% to about 50.0% abrasive particles.

In addition to the components listed above, the finishing composition may also include other conventional additives for finishing compositions in appropriate amounts, such as thickening agents, volatile hydrocarbon solvents, preservatives, dispersants, and fragrances.

Thickening agents may be incorporated into the finishing composition in effective amounts of about 0.2% to about 5.0%, more particularly about 0.5% to about 3.0%, to increase the viscosity and alter rheological characteristics. Examples of suitable thickening agents include carboxyvinyl resins (e.g., "Carbopol", commercially available from Noveon Inc., Cleveland, Ohio), acrylics (e.g., "Acrysol", commcerically available from Rohm and Haas Co., Philadelphia, Pa.), clay (e.g., "Bentone", commercially available from Elementis Specialties Rheox, Highstown, N.J.), and combinations thereof. Thickening agents such as Acrysol acrylics are associative thickening agents, which require associated base chemicals. Base chemicals may be incorporated into the finishing composition in effective amounts of about 0.05% to about 3.0%, more particularly about 0.1% to about 1.0%. Suitable base chemicals include monoethanolamine, diethanolamine, triethanolamine, morpholine, and combinations thereof.

Volatile hydrocarbon solvents may be incorporated into the finishing composition to aid with handling properties. Any volatile hydrocarbon solvent(s) employed are desirably substantially silicone-free. The volatile hydrocarbon solvents may be present in the finishing composition in effective amounts of about 5.0% to about 17.0%, and more particularly in effective amounts of about 10.0% to about 17.0%. Examples of suitable volatile hydrocarbon solvents include petroleum distillates (e.g., "Stoddard Solvent" and "Mineral Spirits", both commercially available from ExxonMobil Chemical Co., Houston, Tex.; "Unocal", commercially available from Citgo Petroleum Corp., Rolling Meadows, Ill.; and "Varsol", commercially available from ExxonMobil Chemical Co.), isoparaffin solvents (e.g., "Isopar", commercially available from ExxonMobil Chemical Co.), saturated hydrocarbon solvents (e.g., "Drakesol", commercially available from Penreco, Houston, Tex.), aliphatic hydrocarbon solvents (e.g., "Exxsol", commercially available from ExxonMobil Chemical Co.), alcohols, ethoxylated alcohols, ethoxylated glycols, and combinations thereof.

Examples of suitable preservatives include aqueous, non-chlorinated, non-metallic preservatives (e.g., "Nuosept", commercially available from International Specialty Products, Wayne, N.J.), microbicide preservatives (e.g., "Nuocide", commercially available from International Specialty Products, Wayne, N.J.), personal-care product preservatives (e.g., "Kathon" commercially available from Rohm and Haas Co.), and combinations thereof. The preservatives may be present in the finishing composition in effective amounts of about 0.1% to about 0.5%, and more particularly in effective amounts of about 0.1% to about 0.3%.

Dispersants may be added to help disperse the abrasive particles in the emulsion of the finishing composition. Examples of suitable dispersants include anionic suspending agents (e.g., "Disperbyk", Byk-Chemie USA, Melville, N.Y.), anionic wetting agents (e.g., "Bykumen", Byk-Chemie USA), and combinations thereof. The dispersants may be present in the finishing composition in effective amounts of about 0.1% to about 5.0%, and more particularly in effective amounts of about 0.2% to about 3.0%.

The finishing composition of the present invention may be formed by mixing water, the volatile siloxane, the lubricant, and, optionally, other additives, such as the volatile hydrocarbon solvent, the base chemical, and the preservative at room temperature. A stable emulsion may be formed at room temperature by combining the emulsifier and the mixture. After the stable emulsion is formed, abrasive particles may be mixed into the emulsion and dispersed. The dispersant may then be optionally added to disperse the abrasive particles in the emulsion. The thickening agent may then be optionally added in appropriate amounts to react with the optional base chemical for increasing the viscosity of the finishing composition. Once all of the desired components are incorporated, the finishing composition may be mixed using a high-shear mixer for about five minutes at room temperature. A suitable high-shear mixer includes a Premier model mixer, commercially available from the Dispersator Company, Temple, Pa.

Once prepared, the finishing composition of the present invention may be used to remove paint defects on vehicle surfaces. After the defect has been sprayed with a clearcoat and removed with an abrasive material, scratch marks remain on the vehicle surface. The finishing composition of the present invention may then be applied and distributed on the vehicle surface with an abrasive buffing pad to remove the scratch marks. Because of the volatile siloxane, the finishing material exhibits good handling properties, such as an acceptable buffing time.

After the initial application and buffing cycle is completed, the volatile siloxane evaporates from the remaining finishing composition. The portion of the finishing composition that remains is substantially free of oily residue, and provides a clear coating through which any remaining scratch marks are visible.

Additional cycles of distributing the finishing composition on the surface with abrasive buffing pads may also take place. Preferably, this occurs using a series of abrasive buffing pads with decreasing abrasive to provide a finer rubbing effect on the vehicle surface. Generally, about three cycles, with a total working time of about 4½ to about 5 minutes, are sufficient to remove the scratch marks and provide a smooth surface upon completion. However, additional application and buffing cycles may be used as appropriate for individual needs. After completion, a surface-protective sealant (seal coat) may optionally be applied to the buffed surface.

Property Analysis and Characterization Procedures

Various analytical techniques are available for characterizing the finishing compositions of the present invention. Several of the analytical techniques are employed herein. An explanation of these analytical techniques follows.

Surface Energy Test

The following test method was used to qualitatively evaluate the surface energy of painted panels after being treated with various finishing compositions. Each finishing composition was applied (not buffed) onto a painted panel in a 5.1-centimeter (cm) diameter circle, and left for one minute. After the minute time period, the remaining finishing composition was wiped off. Krylon Black spray paint, commercially available from Sherwin Williams, Cleveland, Ohio, was then sprayed over the finishing circle on the painted panel. The sprayed paint was then evaluated for fisheye beading (e.g., retraction and non-uniformity of the sprayed paint). If the finishing circle was contaminated with a low surface energy residue, a fisheye beading of the paint would become visually noticeable within one minute.

Working Time and Amount of Oily Residue Test

The following test method was used to qualitatively evaluate the total working time and the amount of oily residue remaining for various finishing compositions. For each finishing composition eight grams of the finishing composition was applied to a 20.3 cm foam buffing pad, commercially available under the trade designation "Perfect-it", part number 05723, from 3M Company, St. Paul, Minn. The buffing pad was attached to a buffing tool, model number DW849, from Dewalt Industrial Tool Company, Baltimore, Md. The buffing pad was then run at 1,500 rotations-per-minute (rpm) at a zero degree angle on a 45.7×61.0×0.081 cm unfinishinged black automotive test panel from ACT Laboratory, Hillsdale, Mich. The test panel included the following coatings: ED6060 E-coat; 764204 Primer; 542AB921 Basecoat; RK8010A Clearcoat.

The test panel was buffed until either dry or until about 1½ to 2 minutes passed if a residual film still remained, whichever came first. The 1½ to 2 minute limit was imposed for the buffing cycle because after about 1½ minutes, the volatile materials within the finishing composition would have substantially evaporated. Any remaining residual film was difficult to remove within a reasonable time by buffing. After the buffing cycle, the amount of oily residue remaining was qualitatively determined.

The buffing cycle was then repeated two more times on the same area of the test panel (i.e., a total of three buffing cycles). After the three buffing cycles, the total working time for the three buffing cycles was recorded. Table 1 provides a numerical scale for the total working time of all three buffing cycles and the amount of oily residue remaining after each buffing cycle.

TABLE 1

| Scale | Total Working Time (seconds) | Amount of Oily Residue |
| --- | --- | --- |
| 1 | 270-300 | None |
| 2 | 240-269 or 300-330 | Light film |
| 3 | 210-239 | Moderate film |
| 4 | 180-209 | Heavy film |
| 5 | Less than 180 or greater than 330 | Very heavy film |

A rating of 4 or greater was considered unacceptable for the total working time and for the amount of oily residue.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from general chemical suppliers such as the Sigma-Aldrich Chemical Company, Saint Louis, Mo., or may be synthesized by conventional techniques.

The following compositional abbreviations are used in the following Examples:

"Siloxane 1": Fluid mixture of decamethylcyclopentasiloxane and dodecamethylcyclohexasiloxane exhibiting a kinematic viscosity of 5 cSt ($5.0 \times 10^{-6}$ m$^2$/s) at 25° C., and commercially available under the trade designation "Dow Corning 345 Fluid" from Dow Corning Corp., Midland, Mich.;

"Siloxane 2": Hexamethyldisiloxane liquid exhibiting a kinematic viscosity of 0.65 cSt ($6.5 \times 10^{-7}$ m$^2$/s) at 25° C., and commercially available under the trade designation "Dow Corning 200 Fluid, 0.65 CST." from Dow Corning Corp., Midland, Mich.;

"Siloxane 3": Polydimethylsiloxane liquid exhibiting a kinematic viscosity of 5 cSt ($5.0 \times 10^{-6}$ m$^2$/s) at 25° C., and commercially available under the trade designation "Dow Corning 200 Fluid, 5 CST." from Dow Corning Corp., Midland, Mich.;

"Siloxane 4": Polydimethylsiloxane liquid exhibiting a kinematic viscosity of 10 cSt ($1.0 \times 10^{-5}$ m$^2$/s) at 25° C., and commercially available under the trade designation "Dow Corning 200 Fluid, 10 CST." from Dow Corning Corp., Midland, Mich.;

"Lubricant 1": Paraffinic oil, commercially available under the trade designation "Sunpar 110" from Sunoco, Inc., Philadelphia, Pa.;

"Lubricant 2": Glycerol, commercially available from Witco Corporation, Memphis, Tenn.;

"Lubricant 3": Mineral oil, commercially available under the trade designation "Parol 70" from Penreco, Houston, Tex.;

"Emulsifier 1": Non-ionic surfactant, commercially available under the trade designation "Tomadol 1-5", from Tomah$_3$ Products, Inc., Milton, Wis.;

"Emulsifier 2": Acetylenic diol-ethylene oxide adduct surfactant, commercially available under the trade designation "Surfynol 465", from Air Products and Chemicals, Inc., Allentown, Pa.;

"Emulsifier 3": Poly(oxyethylene)(20)-sorbitane monooleate non-ionic surfactant, commercially available under the trade designation "Tween 80" from Uniquema, New Castle, Del.;

"Emulsifier 4": 4-(1,1,3,3-Tetramethylbutyl)phenyl-polyethylene glycol non-ionic surfactant, commercially available under the trade designation "Triton X-45" from Dow Chemical Company, Midland, Mich.;

"Emulsifier 5": Non-ionic surfactant, commercially available under the trade designation "Tomadol 1-9", from Tomah$_3$ Products, Inc., Milton, Wis.;

"Emulsifier 6": Polyoxyethylene (10) octylphenol ether non-ionic surfactant, commercially available under the trade designation "Macol OP 10 SP" from BASF Corp., Mount Olive, N.J.;

"Emulsifier 7": Castor oil, commercially available under the trade designation "Emulsion A Oil" from CasChem Inc., Bayonne, N.J.;

"Abrasive 1": Aluminum oxide abrasive in a 40 weight percent aqueous dispersion, designated "784", and manufactured by Ferro Corporation, Cleveland, Ohio;

"Abrasive 2": Aluminum silicate, commercially available under the trade designation "Kaopolite SF" from Imerys Performance Minerals, Dry Branch, Ga.;

"Abrasive 3": Aluminum silicate, commercially available under the trade designation "Kaopolite 1152" from Imerys Performance Minerals, Dry Branch, Ga.;

"Abrasive 4": Aluminum oxide abrasive, designated "783", and manufactured by Ferro Corporation, Cleveland, Ohio;

"Thickener": Alkali swellable acrylic associative thickener, commercially available under the trade designation "Acrysol TT-615" from Rohm and Haas Co., Philadelphia, Pa.;

"Base": Triethanolamine, commercially available from Sigma-Aldrich Chemical Company, Saint Louis, Mo.;

"Solvent 1": Isoparaffin solvent, commercially available under the trade designation "Isopar H" from ExxonMobil Chemical Company, Houston, Tex.;

"Solvent 2": Isoparaffin solvent, commercially available under the trade designation "Isopar M" from ExxonMobil Chemical Company, Houston, Tex.;

"Solvent 3": De-aromitized aliphatic hydrocarbon solvent, commercially available under the trade designation "Exxsol D80" from ExxonMobil Chemical Company, Houston, Tex.;

"Solvent 4": Saturated hydrocarbon solvent, commercially available under the trade designation "Drakesol 165 AT" (formerly "Penreco 2251") from Penreco, Houston, Tex.;

"Solvent 5": Petroleum distillate, commercially available under the trade designation "Stoddard Solvent" from ExxonMobil Chemical Company, Houston, Tex.;

"Solvent 6": Petroleum distillate commercially available under the trade designation "Mineral spirits" from ExxonMobil Chemical Company, Houston, Tex.;

"Solvent 7": Isoparaffin solvent, commercially available under the trade designation "Isopar G" from ExxonMobil Chemical Company, Houston, Tex.;

"Preservative": Aqueous, non-chlorinated, non-metallic preservative, commercially available under the trade designation "Nuosept 95" from International Specialty Products, Wayne, N.J.

"Dispersant": Anionic suspending agent, commercially available under the trade designation "Disperbyk" from Byk-Chemie USA, Melville, N.Y.

Tables 2-19 provide component concentrations for finishing compositions of Examples 1-7 and Comparative Examples A-K, in weight percent based upon the total weight of the given finishing composition. Each finishing composition was formed with the following generalized procedure. The liquid components (e.g., deionized water, Siloxanes 1-4, Lubricants 1-3, Solvents 1-7, the Base, and the Preservative) were combined with the emulsifying component(s) (e.g., Emulsifiers 1-7) and mixed with a laboratory mixer at 21° C. for 15 minutes to form an emulsion. The abrasive particles (e.g., Abrasives 1-3) were then added to the emulsion and mixed with the laboratory mixer at 21° C. for 5 minutes to disperse the abrasive particles within the emulsion. The entire mixture was then mixed with a high-shear mixer (Premier model, commercially available from the Dispersator Co., Temple, Pa.) at 21° C. for 5 minutes. During the high-shear mixing, the Thickener was incrementally added.

For the compositions including the Dispersant, the Dispersant was added after the abrasive particles were added and mixed, and prior to the high shear mixing. The Dispersant was added and mixed with a laboratory air mixer at 21° C. for an additional 5 minutes.

Example 1

Example 1 concerns a finishing composition that includes about 6% of the fluid mixture of decamethylcyclopentasiloxane and dodecamethylcyclohexasiloxane, which are volatile cyclic siloxanes. The fluid mixture exhibits a kinematic viscosity of 5 cSt ($5.0 \times 10^{-6}$ m$^2$/s) at 25° C. Table 2 provides the component concentrations for the finishing composition of Example 1.

TABLE 2

| Component | Percent by Weight |
| --- | --- |
| Deionized Water | 40.59 |
| Siloxane 1 | 5.99 |
| Lubricant 1 | 1.90 |
| Lubricant 2 | 1.20 |
| Emulsifier 4 | 0.25 |
| Abrasive 1 | 29.96 |
| Abrasive 3 | 3.00 |
| Thickener | 1.55 |
| Base | 0.40 |
| Solvent 1 | 9.99 |
| Solvent 4 | 4.99 |
| Preservative | 0.19 |

Example 2

Example 2 concerns a finishing composition that includes about 7% of the volatile cyclic siloxane fluid. Table 3 provides the component concentrations for the finishing composition of Example 2.

TABLE 3

| Component | Percent by Weight |
| --- | --- |
| Deionized Water | 31.75 |
| Siloxane 1 | 7.00 |
| Lubricant 1 | 2.00 |
| Lubricant 2 | 1.00 |
| Lubricant 4 | 0.25 |
| Emulsifier 1 | 0.10 |
| Abrasive 1 | 37.50 |
| Abrasive 2 | 4.00 |
| Thickener | 0.91 |
| Base | 0.30 |
| Solvent 1 | 10.00 |
| Solvent 3 | 5.00 |
| Preservative | 0.19 |

Example 3

Example 3 concerns a finishing composition that includes hexamethyldisiloxane, which is a volatile linear siloxane that exhibits a kinematic viscosity of 0.65 cSt ($6.5 \times 10^{-7}$ m$^2$/s) at 25° C. Table 4 provides the component concentrations for the finishing composition of Example 3. The hexamethyldisiloxane is in approximately the same concentration as the volatile cyclic siloxane provided in the finishing composition of Example 1.

TABLE 4

| Component | Percent by Weight |
| --- | --- |
| Deionized Water | 31.75 |
| Siloxane 2 | 7.00 |
| Lubricant 1 | 2.00 |
| Lubricant 2 | 1.00 |
| Lubricant 4 | 0.25 |
| Emulsifier 1 | 0.10 |
| Abrasive 1 | 37.50 |
| Abrasive 2 | 3.00 |
| Thickener | 1.91 |
| Base | 0.30 |
| Solvent 1 | 10.00 |
| Solvent 3 | 5.00 |
| Preservative | 0.19 |

Example 4

Example 4 concerns a finishing composition that includes about 8% of the volatile cyclic siloxane fluid. Table 5 provides the component concentrations for the finishing composition of Example 4.

TABLE 5

| Component | Percent by Weight |
| --- | --- |
| Deionized Water | 40.01 |
| Siloxane 1 | 7.95 |
| Lubricant 3 | 2.98 |
| Emulsifier 2 | 5.72 |
| Abrasive 4 | 24.85 |

TABLE 5-continued

| Component | Percent by Weight |
|---|---|
| Thickener | 1.39 |
| Solvent 3 | 4.97 |
| Solvent 5 | 9.94 |
| Preservative | 0.19 |
| Dispersant | 1.99 |

Example 5

Example 5 concerns a finishing composition that includes about 8.5% of the volatile cyclic siloxane fluid. Table 6 provides the component concentrations for the 10 finishing composition of Example 5.

TABLE 6

| Component | Percent by Weight |
|---|---|
| Deionized Water | 39.49 |
| Siloxane 1 | 8.41 |
| Lubricant 1 | 7.01 |
| Lubricant 2 | 0.93 |
| Emulsifier 3 | 0.23 |
| Abrasive 1 | 23.37 |
| Abrasive 3 | 4.67 |
| Thickener | 1.31 |
| Base | 0.37 |
| Solvent 4 | 5.61 |
| Solvent 6 | 8.41 |
| Preservative | 0.18 |

Example 6

Example 6 concerns a finishing composition that includes about 8.75% of the volatile cyclic siloxane fluid. Table 7 provides the component concentrations for the finishing composition of Example 6.

TABLE 7

| Component | Percent by Weight |
|---|---|
| Deionized Water | 25.38 |
| Siloxane 1 | 8.79 |
| Lubricant 1 | 1.95 |
| Lubricant 2 | 0.78 |
| Lubricant 3 | 1.95 |
| Emulsifier 5 | 0.24 |
| Abrasive 1 | 41.49 |
| Abrasive 2 | 2.93 |
| Thickener | 1.37 |
| Base | 0.29 |
| Solvent 3 | 5.86 |
| Solvent 7 | 8.79 |
| Preservative | 0.19 |

Example 7

Example 7 concerns a finishing composition that includes about 3% of the 5 polydimethylsiloxane, which exhibits a kinematic viscosity of 5 cSt ($5.0 \times 10^{-6}$ m$^2$/s) at 25° C. Table 8 provides the component concentrations for the finishing composition of Example 7.

TABLE 8

| Component | Percent by Weight |
|---|---|
| Deionized Water | 43.59 |
| Siloxane 3 | 3.00 |
| Lubricant 1 | 1.90 |
| Lubricant 2 | 1.20 |
| Emulsifier 4 | 0.25 |
| Abrasive 1 | 29.96 |
| Abrasive 3 | 3.00 |
| Thickener | 1.55 |
| Base | 0.40 |
| Solvent 1 | 9.99 |
| Solvent 4 | 4.99 |
| Preservative | 0.19 |

Comparative Example A

Comparative Example A concerns a finishing composition that does not include a volatile siloxane, but includes a total hydrocarbon solvent concentration of 19%. Table 9 provides the component concentrations for the finishing composition of Comparative Example A.

TABLE 9

| Component | Percent by Weight |
|---|---|
| Deionized Water | 36.00 |
| Lubricant 2 | 2.00 |
| Lubricant 3 | 1.75 |
| Emulsifier 6 | 0.75 |
| Abrasive 1 | 37.50 |
| Thickener | 1.90 |
| Base | 0.90 |
| Solvent 2 | 5.00 |
| Solvent 4 | 14.00 |
| Preservative | 0.19 |

Comparative Example B

Comparative Example B concerns a finishing composition that includes about 7% of a polydimethylsiloxane, which is a non-volatile linear siloxane that exhibits a kinematic viscosity of 10 cSt ($1.0 \times 10^{-5}$ m$^2$/s) at 25° C. Comparative Example B also includes a total hydrocarbon solvent concentration of 15%. Table 10 provides the component concentrations for the finishing composition of Comparative Example B.

TABLE 10

| Component | Percent by Weight |
|---|---|
| Deionized Water | 31.75 |
| Siloxane 4 | 7.00 |
| Lubricant 1 | 2.00 |
| Lubricant 2 | 1.00 |
| Lubricant 4 | 0.25 |
| Emulsifier 1 | 0.10 |
| Abrasive 1 | 37.50 |
| Abrasive 2 | 3.00 |
| Thickener | 1.90 |
| Base | 0.30 |
| Solvent 1 | 10.00 |
| Solvent 3 | 5.00 |
| Preservative | 0.19 |

Comparative Example C

Comparative Example C concerns a finishing that does not include a volatile siloxane, but includes a total hydrocarbon solvent concentration of 15%. Table 11 provides the component concentrations for the finishing composition of Comparative Example C.

TABLE 11

| Component | Percent by Weight |
| --- | --- |
| Deionized Water | 38.75 |
| Lubricant 1 | 2.00 |
| Lubricant 2 | 1.00 |
| Lubricant 4 | 0.25 |
| Emulsifier 1 | 0.10 |
| Abrasive 1 | 37.50 |
| Abrasive 2 | 3.00 |
| Thickener | 1.90 |
| Base | 0.30 |
| Solvent 1 | 10.00 |
| Solvent 3 | 5.00 |
| Preservative | 0.19 |

Comparative Example D

Comparative Example D concerns a finishing composition that does not include a volatile siloxane, but includes a total hydrocarbon solvent concentration of 22%. Table 12 provides the component concentrations for the finishing composition of Comparative Example D.

TABLE 12

| Component | Percent by Weight |
| --- | --- |
| Deionized Water | 31.75 |
| Lubricant 1 | 2.00 |
| Lubricant 2 | 1.00 |
| Lubricant 4 | 0.25 |
| Emulsifier 1 | 0.10 |
| Abrasive 1 | 37.50 |
| Abrasive 2 | 3.00 |
| Thickener | 1.90 |
| Base | 0.30 |
| Solvent 1 | 10.00 |
| Solvent 2 | 7.00 |
| Solvent 3 | 5.00 |
| Preservative | 0.19 |

Comparative Example E

Comparative Example E concerns a finishing composition that does not include a volatile siloxane, but includes a total hydrocarbon solvent concentration of about 15%. Table 13 provides the component concentrations for the finishing composition of Comparative Example E.

TABLE 13

| Component | Percent by Weight |
| --- | --- |
| Deionized Water | 46.46 |
| Lubricant 1 | 1.89 |
| Lubricant 2 | 1.20 |
| Emulsifier 4 | 0.25 |
| Abrasive 1 | 29.87 |
| Abrasive 2 | 2.99 |
| Thickener | 1.77 |
| Base | 0.40 |
| Solvent 1 | 9.99 |
| Solvent 4 | 5.00 |
| Preservative | 0.19 |

Comparative Example F

Comparative Example F concerns a finishing composition that does not include a volatile siloxane, but includes a total hydrocarbon solvent concentration of about 21%. Table 14 provides the component concentrations for the finishing composition of Comparative Example F.

TABLE 14

| Component | Percent by Weight |
| --- | --- |
| Deionized Water | 40.46 |
| Lubricant 1 | 1.89 |
| Lubricant 2 | 1.20 |
| Emulsifier 4 | 0.25 |
| Abrasive 1 | 29.87 |
| Abrasive 2 | 2.99 |
| Thickener | 1.77 |
| Base | 0.40 |
| Solvent 1 | 9.99 |
| Solvent 2 | 5.99 |
| Solvent 4 | 5.00 |
| Preservative | 0.19 |

Comparative Example G

Comparative Example G concerns a finishing composition that does not include a volatile siloxane, but includes a total hydrocarbon solvent concentration greater than 22%. Table 15 provides the component concentrations for the finishing composition of Comparative Example G.

TABLE 15

| Component | Percent by Weight |
| --- | --- |
| Deionized Water | 39.84 |
| Lubricant 3 | 2.97 |
| Emulsifier 2 | 5.69 |
| Abrasive 4 | 24.74 |
| Thickener | 1.53 |
| Base | 0.30 |
| Solvent 2 | 7.92 |
| Solvent 3 | 4.95 |
| Solvent 5 | 9.90 |
| Preservative | 0.19 |
| Dispersant | 1.98 |

Comparative Example H

Comparative Example H concerns a finishing composition that does not include a volatile siloxane, but includes a total hydrocarbon solvent concentration of about 15%. Table 16 provides the component concentrations for the finishing composition of Comparative Example H.

TABLE 16

| Component | Percent by Weight |
| --- | --- |
| Deionized Water | 47.75 |
| Lubricant 3 | 2.97 |
| Emulsifier 2 | 5.69 |
| Abrasive 4 | 24.74 |
| Thickener | 1.53 |
| Base | 0.30 |
| Solvent 3 | 4.95 |
| Solvent 5 | 9.90 |
| Preservative | 0.19 |
| Dispersant | 1.98 |

Comparative Example I

Comparative Example I concerns a finishing composition that does not include a volatile siloxane, but includes a total hydrocarbon solvent concentration of about 15%. Table 17 provides the component concentrations for the finishing composition of Comparative Example I.

TABLE 17

| Component | Percent by Weight |
| --- | --- |
| Deionized Water | 49.51 |
| Lubricant 1 | 1.99 |
| Lubricant 2 | 1.00 |
| Emulsifier 3 | 0.25 |
| Abrasive 1 | 24.93 |
| Abrasive 2 | 4.99 |
| Thickener | 1.79 |
| Base | 0.40 |
| Solvent 4 | 4.99 |
| Solvent 6 | 9.97 |
| Preservative | 0.19 |

Comparative Example J

Comparative Example J concerns a finishing composition that does not include a volatile siloxane, but includes a total hydrocarbon solvent concentration of about 23%. Table 18 provides the component concentrations for the finishing composition of Comparative Example J.

TABLE 18

| Component | Percent by Weight |
| --- | --- |
| Deionized Water | 41.68 |
| Lubricant 1 | 2.01 |
| Lubricant 2 | 1.01 |
| Emulsifier 3 | 0.25 |
| Abrasive 1 | 25.17 |
| Abrasive 2 | 5.03 |
| Thickener | 1.61 |
| Base | 0.40 |
| Solvent 2 | 7.55 |
| Solvent 4 | 5.03 |
| Solvent 6 | 10.07 |
| Preservative | 0.19 |

Comparative Example K

Comparative Example K concerns a finishing composition that includes about 7% of a polydimethylsiloxane, which is a non-volatile linear siloxane that exhibits a kinematic viscosity of 5 cSt ($5.0 \times 10^{-6}$ m$^2$/s) at 25° C. Comparative Example K also includes a total hydrocarbon solvent concentration of about 15%. Table 19 provides the 1 5 component concentrations for the finishing composition of Comparative Example K.

TABLE 19

| Component | Percent by Weight |
| --- | --- |
| Deionized Water | 31.74 |
| Siloxane 3 | 7.00 |
| Lubricant 1 | 2.00 |
| Lubricant 2 | 1.00 |
| Lubricant 4 | 0.25 |
| Emulsifier 1 | 0.10 |
| Abrasive 1 | 37.49 |
| Abrasive 2 | 3.00 |
| Thickener | 1.95 |
| Base | 0.30 |
| Solvent 1 | 10.00 |
| Solvent 3 | 5.00 |
| Preservative | 0.19 |

Surface Energy Testing for Examples 2, 3, and 7 and Comparative Examples B, D, and K The finishing compositions of Examples 2, 3, and 7 and Comparative Examples B, D, and K were tested according the "Surface Energy Test" procedure described above. Table 20 provides the level of retraction and non-uniformity of paint (i.e., level of fisheye beading) for the finishing compositions of Examples 2, 3, and 7 and Comparative Examples B, D, and K.

TABLE 20

| Sample | Level of Retraction and non-uniformity of Paint |
| --- | --- |
| Example 2 | None |
| Example 3 | None |
| Comparative Example B | Severe |
| Comparative Example D | None |
| Comparative Example K | Minor |

The data provided in Table 20 illustrates the benefits of incorporating volatile siloxanes in the finishing composition of the present invention. The finishing compositions of Examples 2 and 3 did not exhibit any observable fisheye beading. The 15 finishing composition of Example 2 included 7% polydimethylsiloxane with a kinematic viscosity of 0.65 cSt ($6.5 \times 10^{-7}$ m$^2$/s) at 25° C. Similarly, the finishing composition of Example 3 included 7% of a fluid mixture of decamethylcyclopentasiloxane and dodecamethylcyclohexasiloxane, with a kinematic viscosity of 5 cSt ($5.0 \times 10^{-6}$ m$^2$/s) at 25° C. These are volatile siloxanes, which evaporated upon application. The finishing composition of Comparative Example D also did not exhibit any fisheye beading because the composition was substantially free of siloxane materials.

In contrast, the finishing compositions of Comparative Examples B and K exhibited fisheye beading. This was due to the non-volatile siloxanes contained within these finishing compositions. The finishing compositions of Comparative Example B included 7% polydimethylsiloxane with kinematic viscosity of 10 cSt ($1.0 \times 10^{-7}$ m$^2$/s) at 25° C. The finishing compositions of Comparative Example K included 7% polydimethylsiloxane with a kinematic viscosity of 5 cSt ($5.0 \times 10^{-6}$ m$^2$/s) at 25° C. The polydimethylsiloxanes were non-volatile siloxanes, and did not substantially evaporate upon application. Instead, they remained with the compositions, which lowered the surface energy of the test panel, and resulted in the fisheye beading.

In further comparison, the finishing composition of Example 2, which included 7% of a volatile cyclic siloxane with a kinematic viscosities of 5 cSt ($5.0 \times 10^{-6}$ m$^2$/s) at 25° C., exhibited less observable fisheye beading than the finishing compositions of Example 7 and Comparative Examples K.

Working Time and Amount of Oily Residue Testing for Examples 1-7 and Comparative Examples A-K The finishing compositions of Examples 1-7 and Comparative Examples A-K were tested according the "Working Time and Amount of Oily Residue Test" procedure described above. Table 21 provides the total working time rating and the amount of oily residue rating for the finishing compositions of Examples 1-7 and Comparative Examples A-K, pursuant to the numerical scales provided in Table 1. For each finishing composition, the numerical value for the total working time rating represents the working time after all three buffing cycles. The three numerical values for the amount of oily residue rating represent the amount of oily residue after each buffing cycle. Table 21 provides the values for the amount of oily residue after each buffing cycle to further demonstrate the differences in the amounts of oily residue produced by the finishing compositions of Examples 1-7 and Comparative Examples A-K.

TABLE 21

| Sample | Total Working Time Ratings | Amount of Oily Residue Ratings |
| --- | --- | --- |
| Example 1 | 1 | 2, 2, 3 |
| Example 2 | 1 | 1, 2, 2 |
| Example 3 | 3 | 1, 2, 2 |
| Example 4 | 1 | 2, 3, 3 |
| Example 5 | 1 | 2, 2, 3 |
| Example 6 | 1 | 2, 3, 3 |
| Example 7 | 1 | 2, 3, 3 |
| Comparative Example A | 2 | 3, 5, 5 |
| Comparative Example C | 5 | 1, 1, 2 |
| Comparative Example D | 2 | 3, 4, 5 |
| Comparative Example E | 5 | 1, 1, 1 |
| Comparative Example F | 2 | 3, 4, 5 |
| Comparative Example G | 2 | 5, 5, 5 |
| Comparative Example H | 5 | 2, 3, 3 |
| Comparative Example I | 5 | 1, 1, 1 |
| Comparative Example J | 2 | 3, 5, 5 |
| Comparative Example K | 1 | 4, 5, 5 |

The data provided in Table 21 further illustrates the benefit of incorporating volatile siloxanes in the finishing composition of the present invention. The finishing compositions of Examples 1-7 exhibited both acceptable total working times and acceptable amounts of oily residue. The finishing compositions of Examples 1-7 included volatile siloxanes, which provided an adequate amount of time to buff out scratch marks, and also evaporated fast enough for a quick and efficient buffing. Moreover, upon evaporation, the volatile siloxanes did not leave undesirable oily residue behind.

In contrast, the finishing compositions of Comparative Examples A-K exhibited either unacceptable total working times or unacceptable amounts of oily residue. In general, the finishing compositions that were free of siloxane materials and included high concentrations of volatile hydrocarbon solvents (i.e., Comparative Examples A, D, F, G, and J) exhibited acceptable total working times and unacceptable amounts of oily residue. Alternatively, the finishing compositions that were free of siloxane materials and included low concentrations of volatile hydrocarbon solvents (i.e., Comparative Examples C, E, H, I, and K) exhibited acceptable amounts of oily residue and unacceptable total working times.

The finishing composition of Comparative Example B was not tested due to the severe amount of fisheye beading. This would render the finishing composition of Comparative Example B effectively unworkable.

With respect to the finishing compositions of Example 7 and Comparative Example K, the data in Table 21 further illustrates the viscosity barrier between volatile and non-volatile siloxanes. The finishing composition of Comparative Example K exhibited a higher amount of oily residue compared to the finishing composition of Example 7. This result exists despite the small concentration differences, and despite the fact that both compositions incorporated polydimethylsiloxanes that exhibited kinematic viscosities of 5 cSt ($5.0 \times 10^{-6}$ m$^2$/s) at 25° C.

In comparison, the finishing compositions of Examples 1, 2, and 4-6, which included about 6% to about 8.75% of a cyclic siloxane fluid with a kinematic viscosity of 5 cSt ($5.0 \times 10^{-6}$ m$^2$/s) at 25° C., exhibited acceptable total working times and amounts of oily residue. Additionally, the finishing composition of Example 3, which included 7% of a polydimethylsiloxane with a kinematic viscosity of 0.65 cSt ($6.5 \times 10^{-7}$ m$^2$/s) at 25° C., and also exhibited acceptable total working times and amounts of oily residue.

Although the present invention has been described with reference to preferred embodiments, workers skilled in the art will recognize that changes may be made in form and detail without departing from the spirit and scope of the invention.

The invention claimed is:

1. A finishing composition comprising a mixture of abrasive particles and an emulsion, wherein:
    the emulsion comprises water, a volatile siloxane having a boiling point less than 250° C. and selected from volatile cyclic siloxanes, volatile linear methyl substituted siloxanes and volatile branched methyl substituted siloxanes, with the proviso that volatile non-cyclic siloxanes have a kinematic viscosity less than 5 centistokes at 25° C., and a lubricant selected from the group consisting of non-silicone-based mineral, pine and paraffinic oils, oleic acid, glycerol, and combinations thereof; and
    the finishing composition contains 3 to 50 weight percent abrasive particles and no non-volatile silicone materials having a boiling point of at least 250° C.

2. The finishing composition of claim 1, wherein the volatile siloxane constitutes about 3-20% by weight of the finishing composition and is selected from the group consisting of:
    linear siloxanes represented by the average forunmla (CH$_3$)$_2$SiO{SiO(CH$_3$)$_2$}$_a$Si(CH$_3$)$_3$ in which a is 0-5; cyclic siloxanes represented by the formula {SiO (CH$_3$)$_2$}$_b$ wherein b is 4-6; and branched siloxanes which are derivatives of linear and cyclic siloxanes.

3. The finishing composition of claim 1, wherein the volatile siloxane comprises a volatile cyclic siloxane.

4. The finishing composition of claim 3, wherein the volatile cyclic siloxane is selected from a group consisting of octamethylcyclotetrasiloxane, decamethylcyclopentasiloxane, dodecamethylcyclohexasiloxane, and combinations thereof.

5. The finishing composition of claim 1, wherein the finishing composition further comprises a volatile hydrocarbon solvent.

6. The finishing composition of claim 1, wherein the abrasive particles have an average particle size of about two to one hundred micrometers.

7. The finishing composition of claim 1, wherein the abrasive particles are selected from a group consisting of aluminum oxide, silica, alumina silicates, silicon carbides, and combinations thereof.

8. The finishing composition of claim 7, wherein the volatile siloxane comprises a volatile cyclic siloxane.

9. The finishing composition of claim 1 wherein:
the water constitutes about 10 to about 60% by weight of the finishing composition;
the volatile siloxane constitutes about 3 to about 20% by weight of the finishing composition;
and the lubricant constitutes about 0.1 to about 10% by weight of the finishing composition.

10. The finishing composition of claim 9 wherein:
the water constitutes about 30 to about 50% by weight of the finishing composition;
the volatile siloxane constitutes about 5 to about 10% by weight of the finishing composition;
and the lubricant constitutes about 1 to about 5% by weight of the finishing composition.

11. The finishing composition of claim 10, wherein the volatile siloxane comprises a volatile cyclic siloxane.

12. A finishing composition comprising:
a volatile cyclic siloxane having a boiling point of less than 250° C.;
a non-silicone-based lubricant selected from mineral, pine and paraffinic oils, oleic acid, glycerol, and combinations thereof;
a thickening agent;
a volatile hydrocarbon solvent;
water;
an emulsifier; and
3 to 50 weight percent aluminum oxide particles;
with the proviso that the finishing composition contains no non-volatile silicone materials having a boiling point of at least 250° C.

13. The finishing composition of claim 12, wherein the volatile cyclic siloxane is selected from a group consisting of octamethylcyclictetrasiloxane, decamethylcyclicpentasiloxane, dodecamethylcyclichexasiloxane, and combinations thereof.

14. The finishing composition of claim 12 wherein:
the volatile siloxane constitutes about 3 to about 20% by weight of the finishing composition;
the lubricant constitutes about 0.1 to about 10% by weight of the finishing composition;
the thickening agent constitutes about 0.2 to about 5% by weight of the finishing composition;
the volatile hydrocarbon solvent constitutes about 5 to about 17% by weight of the finishing composition;
water constitutes about 10 to about 60% by weight of the finishing composition; and
the emulsifier constitutes about 0.1 to about 10% by weight of the finishing composition.

15. A method of making a composition, said method comprising:
combining a mixture of water, a volatile siloxane having a boilinn point less than 250° C. selected from volatile cyclic siloxanes, volatile linear siloxanes and volatile branched siloxanes, with the proviso that volatile non-cyclic siloxanes have a kinematic viscosity less than 5 centistokes at 25° C., a non-silicone-based lubricant selected from the group consisting of oils, oleic acid, glycerol, and combinations thereof, and an emulsifier to form an emulsion, wherein the emulsifier is effective to create a stable emulsion; and
mixing sufficient abrasive particles into the emulsion to form the composition comprising 3 to 50 weight percent abrasive particles, with the proviso that no non-volatile silicone materials having a boiling point of at least 250° C. are used in making the composition.

16. A. method of finishing a surface, said method comprising:
applying the finishing composition of claim 1 on the surface; and
allowing the volatile siloxane to substantially evaporate from the surface and leave a remaining portion of the finishing composition on the surface, wherein the remaining portion of the finishing composition is substantially free of oily residue.

17. The finishing composition of claim 2 in which the volatile siloxane is selected from the group consisting of: hexamethyldisiloxane, octamethyltrisiloxane, decamethyltetrasiloxane, dodecamethylpentasiloxane, tetradecamethylhexasiloxane, hexadecamethylheptasiloxane, octamethylcyclotetrasiloxane, decamethylcyclopentasiloxane, dodecamethylcyclohexasiloxane, heptamethyl-3-{(trimethylsilyl)oxy}trisiloxane, hexamethyl-3,3,bis{(trimethylsilyl)oxy}trisiloxane, pentamethyl{(trimethylsilyl)oxy}cyclotrisiloxane, and heptamethyl{(trimethylsilyl)oxy}cyclotetrasiloxane.

* * * * *

UNITED STATES PATENT AND TRADEMARK OFFICE
CERTIFICATE OF CORRECTION

PATENT NO. : 7,381,231 B2  Page 1 of 1
APPLICATION NO. : 10/767633
DATED : June 3, 2008
INVENTOR(S) : Richard S. Smith It is certified that error appears in the above-identified patent and that said Letters Patent is hereby corrected as shown below:

Column 2
Line 1, delete the word "Consensed" and insert in place thereof -- Condensed --.

Column 5
Line 3, delete the word "commcerically" and insert in place thereof -- commercially --.
Line 5, delete the word "Highstown" and insert in place thereof -- Hightstown --.

Column 8
Line 61, delete the word "De-aromitized" and insert in place thereof
-- De-aromatized --.

Column 11
Line 17, after the words "for the" delete "10".
Line 64, after the words "of the" delete "5".

Column 16
Line 2, after the words "provides the" delete "1 5".
Line 47, after "The" delete "15".

Column 18
Line 56, delete the word "forunmla" and insert in place thereof -- formula --.

Column 20
Line 14, delete the word "boilinn" and insert in place thereof -- boiling --.
Line 29, after the word "A" delete ".".

Signed and Sealed this

Fourth Day of November, 2008

JON W. DUDAS
*Director of the United States Patent and Trademark Office*